United States Patent [19]

Glave

[11] Patent Number: 5,244,007
[45] Date of Patent: Sep. 14, 1993

[54] RELIEF VALVE

[76] Inventor: Eric C. Glave, 510 NW. 109th Ave., #5, Miami, Fla. 33172

[21] Appl. No.: 981,698

[22] Filed: Nov. 25, 1992

[51] Int. Cl.⁵ ............................................. F16K 17/04
[52] U.S. Cl. ................................... 137/212; 137/881; 222/397
[58] Field of Search ................ 137/212, 881; 222/397, 222/400.7

[56] References Cited

U.S. PATENT DOCUMENTS

| | | | |
|---|---|---|---|
| 1,630,785 | 5/1927 | Collins | 137/212 X |
| 2,548,352 | 4/1951 | Courtat | 137/881 X |
| 3,520,323 | 7/1970 | Lamb | 137/212 |
| 4,768,550 | 9/1988 | Krechel et al. | 137/881 X |

*Primary Examiner*—John C. Fox
*Attorney, Agent, or Firm*—J. Sanchelima

[57] ABSTRACT

A relief valve to be used in cases for transformers submerged in oil that requires periodic testing for concentration of pollutants. A T-shape body having an upper tubular member with an internal through passage with an internal thread inside one of its ends and the other end having an external thread that is cooperatively received within a threaded bore in a transformer case. A perpendicularly extending tubular member includes an exhaust chamber wherein a spring loaded valve assembly is housed. The load in the spring is predetermined to permit the pressure that builds inside the case not to exceed a predetermined value. Using a flexible plastic tube that is insertable through the internal passage and applying a pressurized gas, preferably nitrogen, through the tire valve, a specimen of the liquid inside the case is extracted for analysis and testing without having to open the case.

5 Claims, 2 Drawing Sheets

RELIEF VALVE

BACKGROUND OF THE INVENTION

1. Field of the Invention

The present invention relates to a relief valve, and more particularly, to such a valve that is used to extract a liquid from a sealed container through the injection of pressurized gas.

2. Description of the Related Art

Applicant believes that the closest reference corresponds to U.S. Pat. No. Des. 226,431 issued to Embury. However, it differs from the present invention because it fails to provide for means to extract liquids that may be contained within the container whose pressure it is intended to control. The same thing can be said of U.S. Pat. No. 3,189,040 issued to Johnson. None of these references are concerned with the exposure of workers to the pollutants that exist inside the cases for transformers nor do they even suggest how to facilitate the extraction of specimens of the liquid, typically oil, in which the transformer coil is submerged. When transformer's are serviced with conventional procedures there is a down time problem because the seals of the case need to be tested. This requires that the pressure relief valve be replaced with a time valve type so that it can be pressurized. Afterwards, the relief valve is replaced.

It is known that these transformer cases require constant testing making it necessary to open the cases periodically with the consequent exposure to the worker and to the environment of highly toxic pollutants. See enclosed the relevant pages of the Federal Register of May 31, 1979: Polychlorinated Biphenyis (PCB); Criteria Modification, Hearings, which is incorporated hereto by reference. The present invention permits ready access to the liquid inside these sealed containers with a minimum of exposure, and it does not require replacement of valves thereby minimizing down time.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a relief valve that can be utilized to extract the liquid inside a sealed container without having to open it.

It is another object of this invention to provide a relief valve that can provide the pressure relief function and also it can be used to safely extract liquid from a sealed container by introducing a sufficient amount of pressurized gas.

It is still another object of the present invention to provide safe means for testing the concentration of pollutants inside transforms cases.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
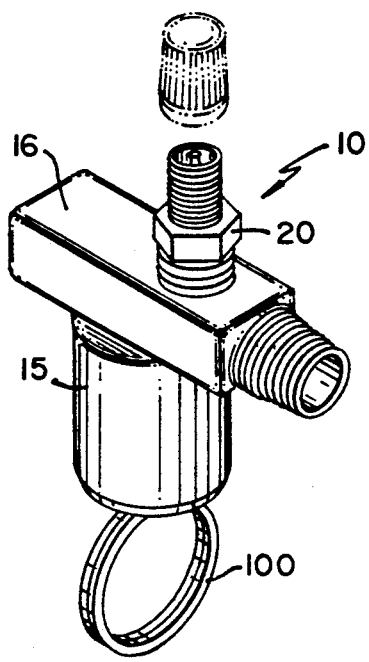
FIG. 1 represents an isometric view of the pressure relief valve subject of the present application.
Figure 2:
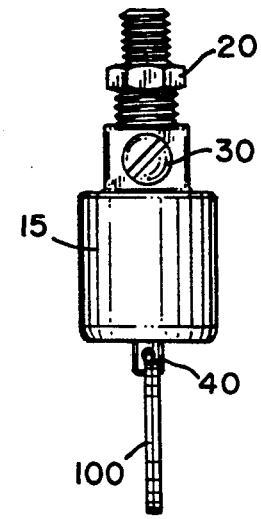
FIG. 2 shows an elevational end view of the valve represented in FIG. 1.
Figure 3:
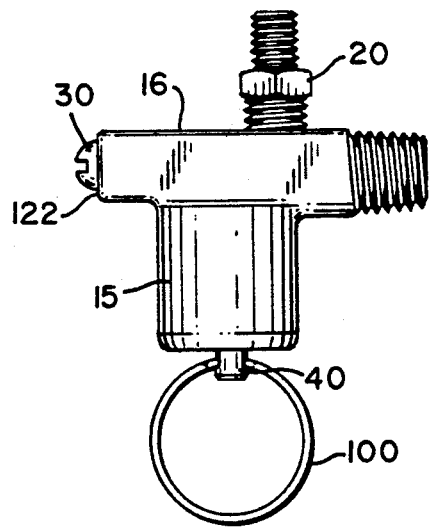
FIG. 3 illustrates a elevational side view of the valve represented in the previous two figures.
Figure 4:
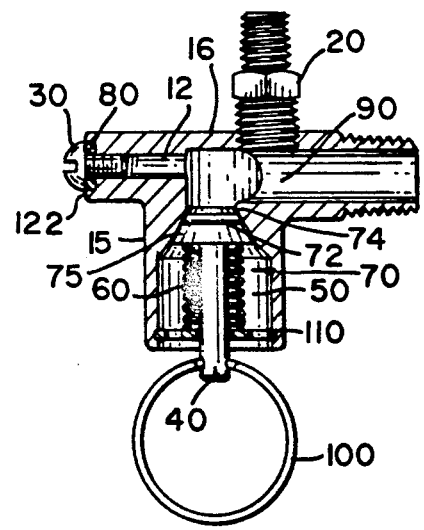
FIG. 4 is a cross-sectional representation of the valve shown in the previous figures.
Figure 5:
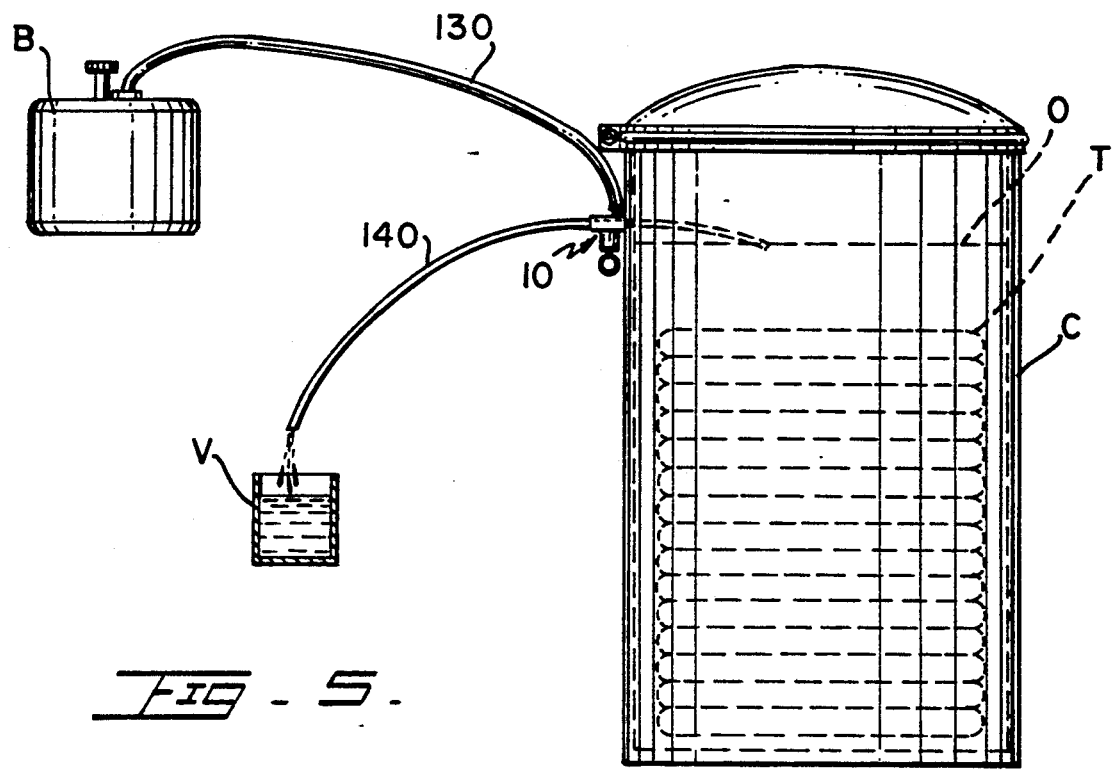
FIG. 5 shows the present invention in use whereas a flexible plastic tubing member is inserted through the valve and pressurized gas in applied the tire valve thereby forcing the oil on to and into vessel V.
Figure 6:
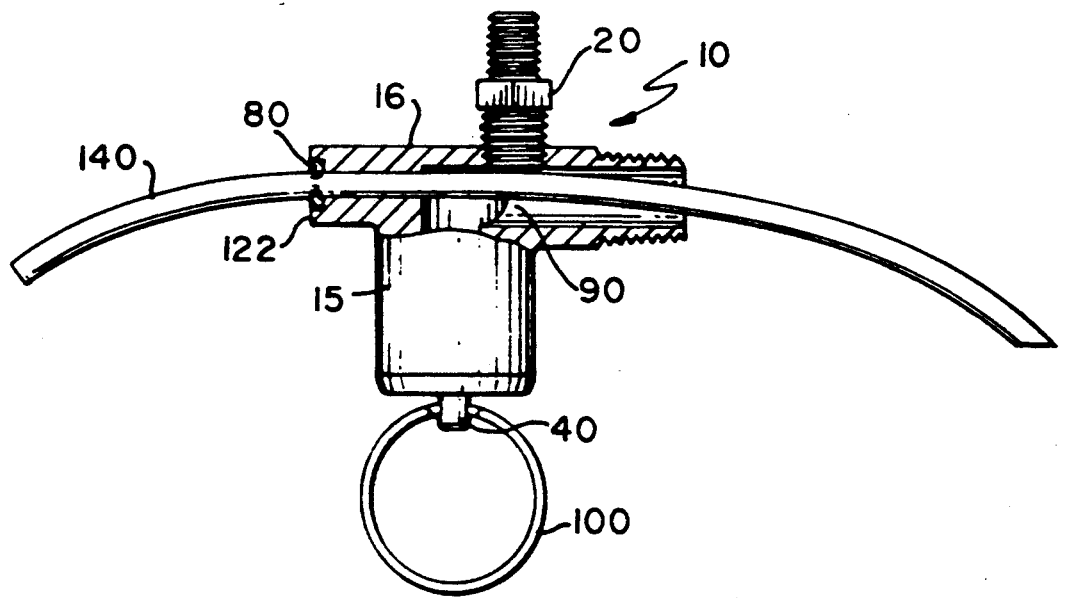
FIG. 6 is an enlarged partial cross-section of the relief valve with the plastic tubing.

Referring now to the drawings, where the present invention is generally referred to with numeral 10, it can be observed that it basically includes T-shape body 15 with tire valve 20 mounted on upper tubular member 16 with an internal through passage. The through passage is defined with bore 12 at one end having an internal thread and being connected to connecting chamber 90 at the other end of the through passage. Spring loaded valve assembly 70 includes O-ring 72 that is cooperatively urged against valve seat 74 at the upper end of exhaust chamber 50. Spring member 60 is coiled around plunge member 40 urging valve member 75 against its seat. Spring member 60 has two ends. One of them in contact with the underside of valve member 75 and the other end exerting a force against perforated base member 110. Ring 100 is engaged to plunge member 40 and permits a user to retract valve assembly 70 from its seat thereby connecting exhaust chamber 50 with connecting chamber 90 pass 12.

Passage 12 includes a threaded termination at its outer end 122 and terminates with an overbore that cooperatively and tightly receives O-ring 80. Machine screw member 30 is matingly and tightly received within the threaded termination 122. The other end of passage 12 is connected to connecting chamber 90 which is inturn connected directly with the interior of transformer case C. If the pressure develops inside case C exceeds a predetermined level, spring loaded valve member 70 is overcome thereby providing the intended relief.

In operation, a user preferably first releases all pressure inside a transformer case, or any other enclosed container, in order to facilitate working with the case since otherwise it would drastically blow out machine screw member 30. Next, machine screw member 30 is taken out and a flexible plastic tubing 140 is inserted through passage 12, connecting chamber 90 and into transformer case C. Plastic tubing 140 is tightly inserted through O-ring 80 to provide an air tight interface. Then, pressurized gas, preferably nitrogen, is applied to tire valve 20 from balloon B and tubing 130 so that the pressure inside case C is built up forcing oil O out. In this manner a user can extract a specimen of the oil for testing purposes without having to open case C. After a sufficient amount of oil is collected in vessel V, a user may pull flexible plastic tubing 100 out above the liquid level thereby stopping the flow.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A relief valve to be used in cases for transformers submerged in a liquid and that include a threaded bore, comprising:
   A. a T-shape body having an upper tubular member with an internal through passage and said tubular member having two ends, one of said ends having an internal thread and the other end having an external thread that is cooperatively received within said threaded bore, and a centrally disposed perpendicular tubular member having an inner exhaust chamber connected to said internal through passage;
   B. tire valve means mounted on said upper tubular member to provide pressurized gas to said internal through passage;
   C. spring loaded valve means housed within said inner exhaust chamber; and
   D. screw means receivable within the end having said internal thread.

2. The relief valve set forth in claim 1 further including:
   E. tubing means for extracting the liquid inside said cases and said tubing means being insertable within said internal through passage and
   F. means for supplying pressurized gas to said cases through said tire valve means.

3. The relief valve set forth in claim 2 wherein the end with said internal thread is terminated with an overbore and further including O-ring means that is cooperatively and tightly received within said overbore.

4. The relief valve set forth in claim 3 wherein said gas is an inert gas.

5. The relief valve set forth in claim 4 wherein said spring load valve means includes a plunge member that protrudes outwardly from said relief valve.

* * * * *